Aug. 1, 1944.  E. M. MOREHOUSE  2,354,960
CONTROL VALVE
Filed July 6, 1942
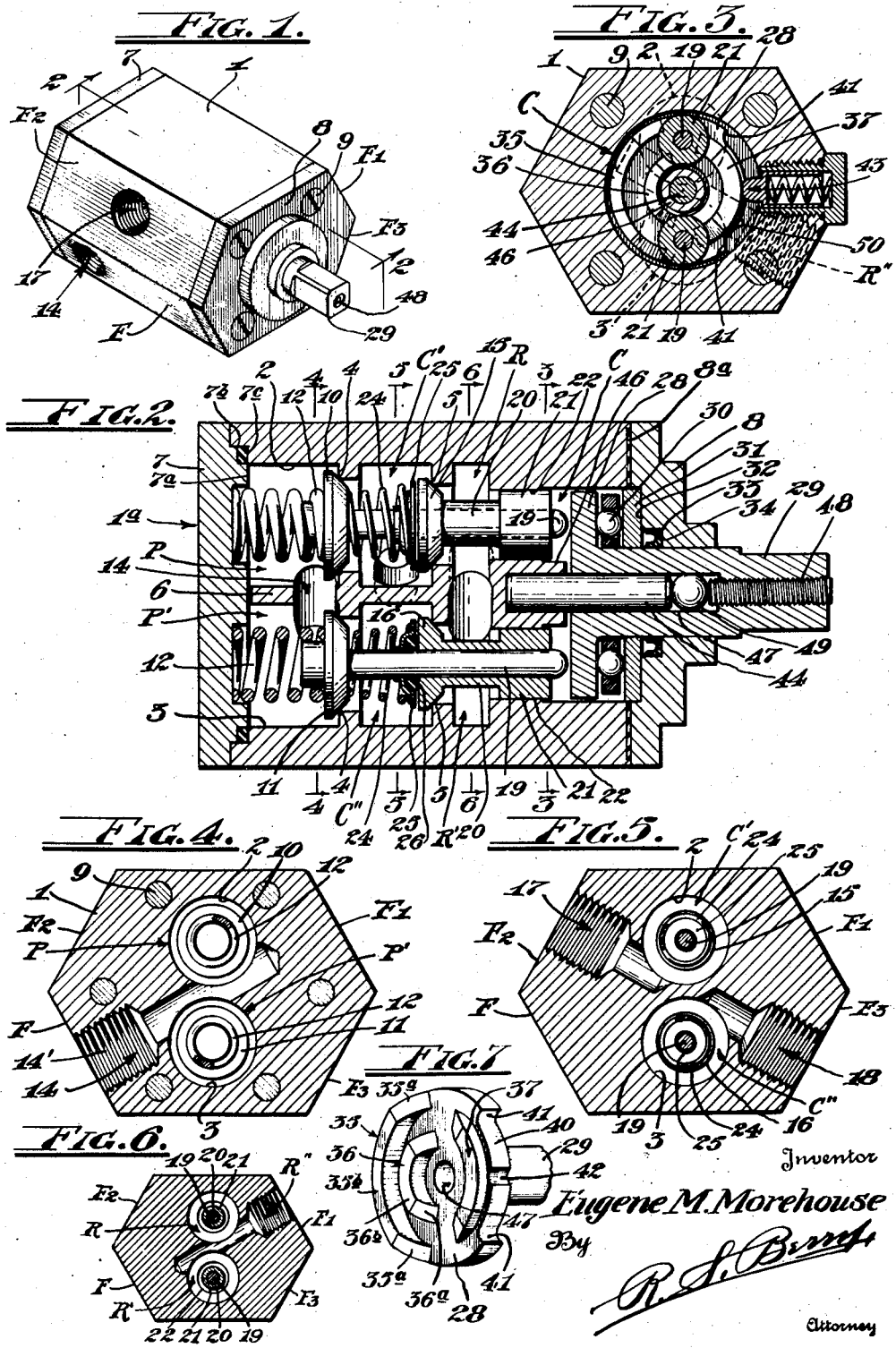
Inventor
Eugene M. Morehouse
By
R. S. Berry
Attorney Patented Aug. 1, 1944

2,354,960

UNITED STATES PATENT OFFICE 2,354,960

CONTROL VALVE

Eugene M. Morehouse, Tujunga, Calif., assignor to Adel Precision Products Corp., a corporation of California Application July 6, 1942, Serial No. 449,920

8 Claims. (Cl. 137—144)

This invention relates to valves for controlling the hydraulically operated landing gear, landing flaps, engine cowl flaps, bomb doors, gun turrets, and other mechanisms in aircraft.

The primary object of this invention is to provide a control valve of the character described which is exceptionally light as to weight, simple as to construction, small, compact, and capable of reliable performance under the high pressures now used in aircraft hydraulic systems.

Another object of my invention is to provide a control valve of the character described wherein the valve members and operating means therefore are constructed and arranged in a particular manner to the end that the construction of the entire assembly is simplified and made more compact, a marked reduction in bulk and weight is provided, the assembling and disassembling operations are facilitated, costly machining operations are eliminated, and the efficiency of the unit appreciably increased.

A further object of my invention is to provide a valve of the character described wherein the valve operating means is of novel construction and arrangement subject to being housed in a chamber formed by cutting away at one end of the valve body member the separating web portion between two parallel valve-receiving bores which extend said body member by counterboring said bores, thus accommodating the operating means in what may be termed an enlargement of the receiving bores and making it unnecessary to machine a separate bore for the valve operating means while also giving a substantially coaxial disposition of all separate valve parts within the body member, thereby achieving a better balance of the unit as well as making it easier to assemble and disassemble it.

Another object of my invention is to provide a valve assembly of the character described wherein the several ports for conducting fluid to and from the valve are straight and comparatively short, if not shorter than heretofore, and may be conveniently located at various points as desired between the ends of the valve body member to open on side faces thereof to best suit the particular installation, reduce machining costs, and insure ample and unrestricted flow of the operating fluid through the valve assembly without appreciable pressure drop.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a perspective view of a valve embodying my invention;

Fig. 2 is a sectional view taken on the plane of line 2—2 of Fig. 1;

Figs. 3, 4, 5, and 6 are sectional views taken on the lines 3—3, 4—4, 5—5 and 6—6 of Fig. 2; Fig. 6 being reduced;

Fig. 7 is a fragmentary perspective view of the cam unit for operating the valve members.

Referring to the drawing more specifically, the valve of my invention includes an elongated body member 1 made of a suitable bar stock aluminum alloy and as here shown of hexagonal cross section to minimize weight.

Formed in the body member to extend longitudinally therethrough are parallel valve-receiving bores 2 and 3 each of which is provided at points axially spaced apart with valve seats 4 and 5. These seats are annular and of somewhat smaller diameter than the bores 2 and 3, the seats 5 being of smaller diameter than the seats 4.

The bores 2 and 3 are separated by means of a small web or partition portion 6 which extends along the longitudinal median line of the valve body member 1 from a point inwardly spaced from the valve body end 1a (Fig. 2) thereof to a point spaced inwardly a greater distance from the end 1b (Fig. 2) of said body member. This greater spacing of the partition from the end 1b is accomplished by boring out the partition 6 between the bores 2 and 3 axially from the end 1b and this operation provides an annular cam-receiving chamber C of sufficient capacity to house the valve operating means in substantially coaxial relation to said bores.

A closure member or plate 7 has a boss 7a on its inner face which fits into a counterbore 7b in the end 1a of the body member and closes the adjacent ends of the bores 2 and 3, there being a sealing gasket 7c interposed between the closure plate and the end of the body member.

A closure member or plate 8 closes and seals the end 1b of the body member, there being a sealing gasket 8a between said end and the plate 8. Bolts 9 passing longitudinally into the body member securely hold the plates 7 and 8 in place.

In accordance with the present invention a pressure valve 10 of the poppet type is mounted in the bore 2 to seat on the seat 4. A similar pressure valve 11 is mounted in the bore 3 to seat on the seat 4 therein. Springs 12 are interposed between the cap 7 and the valves 10 and 11 to urge said valves against their respective seats.

However, these valves are arranged to be urged against their seats by the pressure of the hydraulic fluid which enters pressure chamber portions P and P' of the valve bores 2 and 3, said portions being defined between the valve seats 4 and the closure plate 7.

Hydraulic fluid under pressure from a suitable source (not shown) enters the chamber portions P and P' through a single diagonally extended intake port 14 which intersects and is common to the pressure chamber portions as clearly shown in Fig. 4. This port opens through a side face F of the body member near the end 1a of said body member as shown in Fig. 4, and is screw threaded as at 14' at its outer end for connection with a feed line (not shown). This intake passage terminates at a point spaced well inwardly from the opposite side face F1 of the body member, it being noted that said passage intersects the longitudinal center line of the valve body.

A return poppet valve 15 is mounted in the bore 2 to seat on the seat 5 therein whereas a return poppet valve 16 is mounted in the bore 3 to seat on the seat 5 in the latter, these valves being located in cylinder chamber portions C' and C" which are defined in said bores between the seats 4 and 5. Operating ports 17 and 18 lead diagonally outwardly from the chambers P and P' to open through opposite side faces F2 and F3 of the body member 1 as shown in Fig. 5 and provide for connection of the valve unit with opposite ends of a hydraulic cylinder or motor (not shown).

It should be noted that the two valve members in each of the bores 2 and 3 are concentric and that the stems 19 of the pressure valves 10 and 11 slidably extend through the centers of the return valves 15 and 16 and through and beyond tubular stems 20 carried by the return valves. The stems 20 are provided with piston-like guides 21 at their free ends working in and sealing the upper ends of reduced cylindrical portions 22 of the bores 2 and 3, which reduced cylindrical portions open into the cam chamber C.

Springs 24 interposed between the inner faces of the valves 15 and 16 and keepers 25 axially slidable on the stems 19, serve to urge the valves 15 and 16 against the seat therefor. The keepers 25 are concaved on one side to accommodate packing rings 26 of circular cross section which surround the stems 19 to prevent leakage around said stems through the tubular stems 20.

The bores 2 and 3 are provided between the seats 5 and the reduced cylinder portions 22 and portions 21 with return chambers R and R' into which fluid returned through the ports 17 and 18 will flow from chambers C' and C" when the return valves are opened. A return port R" extends diagonally through the body member from tne side face F1 as shown in Fig. 6 so as to intersect the chambers R and R' in the same manner as the intake port 14 shown in Fig. 4. This return port provides for the return of the operating fluid to the reservoir or intake side of the pump (both of which are not here shown) in a manner well known in this art.

As here provided the valves are subject to operation by an operating means located in the cam chamber C and arranged in a particularly novel manner relative to the valve members and body member for the purpose of reducing machining costs, simplifying the construction of said operating means and valve unit as a whole, and reducing the bulk, size and weight thereof while also eliminating any extension transversely of the body whereby the unit will have uniform dimensions transversely and provide a more nearly symmetrical and better balanced design than in control valves as heretofore made. The operating means is in effect housed in a chamber formed by enlarging or joining in a simple manner the two main bores and this makes it unnecessary to machine a separate bore for the operating means.

As here shown the valve operating means includes a rotary cam disk 28 disposed in the cam chamber C and carried on the inner end of a cam shaft 29 operating on an axis parallel to the axes of the bores 2 and 3. This cam shaft is coaxial with the longitudinal axis of the body member 1 and extends through the center of the cap 8 so that its outer end is subject to rotation as by means of an operating handle, lever or the like (not shown).

The cam disk 28 rotates on ball bearings 30 interposed between the outer face of the disk and a flat bearing ring 31 which latter is fitted in a recess 32 in the inner face of the closure cap 8. The flat ring 31 retains a sealing washer 33 in a recess 34 in the cap 8 to prevent leakage around the cam shaft 29.

On the inner face of the cam disk 28 are arcuate concentric cams 35 and 36 which will simultaneously engage the lower end of the valve stems 20 of the return valve 15 when the disk is rotated in one direction and likewise engage and lift the lower end of the stem of the return valve 16 when the disk is rotated in the other direction, in either instance from a predetermined neutral position. These cams are constructed so that but a few degrees of movement in either direction from neutral position will cause the sharply inclined lifts 35a and 36a thereof to raise and fully unseat return valves whereas during the remainder of the rotary movement of the disk the particular return valve will be held open, riding at this time on the plane surface dwells 35b and 36b of the cams. The spacing of the cams 35 and 36 is such that they will straddle the lower ends of the stems 19 of the pressure valves 10 and 11 during the operation aforesaid.

A single arcuate cam 37 on the disk 28 is arranged so that when one of the return valves 15 and 16 is opened by the cams 35 and 36 one of the pressure valves 10 and 11 will be lifted and opened. The cam 37 is constructed like the other cams in that it opens the pressure valves with but a small amount of movement and thereafter maintains the said valves open over a wide range of further movement of the cam disk.

As a means for limiting the movement of the cam disk within desired limits, said disk is provided with a peripheral recess 40 providing stop shoulders 41 at the ends of the recess and having a notch 42 centrally of the ends of the recess. A spring loaded detent 43 is carried by the valve body member and extends into the recess 40 so that it will cooperate with the notch 42 and the stop shoulders 41. Fig. 3 clearly shows the specific arrangement of the detent 43 and the recess 40, the detent being shown engaged in the notch 42 to releasably hold the cam disk in neutral position with the lift surfaces of the several cams ready to commence lifting the valves responsive to movement of the cam disk in either direction from neutral position.

An important feature of this invention is the provision of a novel bearing and adjusting means for the cam disk and its operating shaft.

This means includes, as best shown in Fig. 2, a bearing pin 44 mounted in a short bore 45 formed in the enlarged end 46 of the web or partition portion 6, said pin being for the greater part likewise extended into a bore 47 which extends through the center of the cam disk 28 and shaft 29. The outer portion of the bore 47 is screw threaded and receives a screw 48 the inner end of which contacts a ball bearing 49 which seats against the wall of the bore 48 and the outer end of the bearing pin 44. Axial adjustment of the screw 48 which is accessible for turning at the outer end of shaft 29 will provide for the desired adjustment of the cam and bearings to compensate for wear. This arrangement also provides a most effective thrust bearing and support for the shaft and cam disk and makes for ease and reliability of operation of the valves.

To prevent trapping of hydraulic fluid which may leak into the chamber C, a bleed passage 50 is formed in the wall of said chamber to lead directly into the return port R''.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. In a hydraulic control valve, an elongated valve body member having parallel bores extending longitudinally therethrough and separated by an integral partition portion extending substantially along the longitudinal medial line of said body member, said partition being removed adjacent to one end of said body member to form an axial chamber for valve operating means, a closure secured to the other end of the body member to close said bores, another closure secured to said one end of said body member to close said chamber, valve seats in said bores, valve members mounted in said bores for cooperation with said seats, ports extending through said body member from outer surfaces thereof into said bores for conducting fluid to and from said bores under control of said valve members, stems on said valve members extending axially of and into said chamber, an operating shaft extending through the closure for said chamber and axially into said chamber, and means in said chamber responsive to the turning of said shaft for operating said valve members; a bearing pin coaxial with and extending into said shaft; bores in said partition and shaft respectively receiving said pin, a screw axially adjustably mounted in the bore of said shaft and a ball bearing interposed between said pin and said screw.

2. In a hydraulic control valve, an elongated valve body member having parallel bores extending longitudinally therethrough and separated by an integral partition portion extending substantially along the longitudinal medial line of said body member, said partition being removed adjacent to one end of said body member to form an axial chamber for valve operating means, a closure secured to the other end of the body member to close said bores, another closure secured to said one end of said body member to close said chamber, valve seats in said bores, valve members mounted in said bores for cooperation with said seats, ports extending through said body member from outer surfaces thereof into said bores for conducting fluid to and from said bores under control of said valve members, stems on said valve members extending axially of and into said chamber, an operating shaft extending through the closure for said chamber and axially into said chamber, means in said chamber responsive to the turning of said shaft for operating said valve members, including a cam disk in said chamber and cams on said disk for cooperation with said stems, a bearing ring lying against the closure for said chamber, anti-friction bearings interposed between said disk and said ring, a thrust bearing pin coaxial with and extending into said shaft and said partition respectively for receiving said pin, a screw axially adjustably threaded in the bore in said shaft, and a ball bearing interposed between said screw and an end of said pin.

3. In a hydraulic control valve, an elongated valve body member having parallel bores extending longitudinally therethrough and separated by an integral partition portion extending substantially along the longitudinal medial line of said body member, said partition being removed adjacent to one end of said body member to form an axial chamber for valve operating means, a closure secured to the other end of the body member to close said bores, another closure secured to said one end of said body member to close said chamber, axially spaced valve seats in each of said bores, a pressure poppet valve in each bore arranged to engage one of the seats therein, a stem on each pressure valve extending through the related bore and into said chamber, an inlet port for fluid under pressure extending through said body member from a side face thereof so as to intersect said bores and the longitudinal medial line of said body member for supplying fluid under pressure to said bores between the pressure valves and the first named closure, a return poppet valve in each bore adapted to engage the other seat therein, a tubular stem on each return valve slidably receiving the stem of the associated pressure valve and extending into said chamber, operating ports extending through said body member from opposite side faces thereof to communicate with said bores at points between said valve seats, for conveying pressure and return fluid between the valve body and a fluid responsive device, return chamber portions in said bores between said chamber for the valve operating means and the return valve seats, said return valve stems closing and sealing the portions of the bores between the return chamber portions and the chamber for the operating means, a return port extending through said body member from a side face thereof and intersecting said return chamber portions, a shaft extending through the second named closure and axially into said chamber, and means in said chamber responsive to turning of said shaft for operating pressure and return valves.

4. In a hydraulic control valve, an elongated valve body member having parallel bores extending longitudinally therethrough and separated by an integral partition portion extending substantially along the longitudinal medial line of said body member, said partition being removed adjacent to one end of said body member to form an axial chamber for valve operating means, a closure secured to the other end of the body member to close said bores, another closure secured to said one end of said body member to close said chamber, axially spaced valve seats in each of said bores, a pressure poppet valve in each bore arranged to engage one of the seats therein, a stem on each pressure valve extending through the related bore and into said chamber, an inlet port for fluid under pressure extending through said body member from a side face thereof so as to intersect said bores and the longitudinal medial line of said body member for supplying fluid under pressure to said bores between the pressure valves and the first named closure, a return poppet valve in each bore adapted to engage the other seat therein, a tubular stem on each return valve slidably receiving the stem of the associated pressure valve and extending into said chamber, operating ports extending through said body member from opposite side faces thereof to communicate with said bores at points between said valve seats, for conveying pressure and return fluid between the valve body and a fluid responsive device, return chamber portions in said bores between said chamber for the valve operating means and the return valve seats, said return valve stems closing and sealing the portions of the bores between the return chamber portions and the chamber for the operating means, a return port extending through said body member from a side face thereof and intersecting said return chamber portions, a shaft extending through the second named closure and axially into said chamber, means in said chamber responsive to turning of said shaft for operating pressure and return valves, springs for urging said valves toward their seats, a sealing ring surrounding the pressure valve stems and lying against the return valves, and spring keepers slidably mounted on said stems and engaged with said ring and with the ends of the springs for the return valves to hold the sealing rings in place and transmit the seating force to the return valves.

5. In a valve, a valve body member having bores therein and a chamber coextensive with certain ends of said bores, valve seats in said bores, valves movable in said bores into and out of engagement with said seats, stems on said valves extending into said chamber, ports extending through said body member into said bores, a shaft extending into said chamber for rotation about an axis extending in the general direction of the major axes of said bores, a cam member mounted on said shaft within said chamber and operatively engaged with said stems, said shaft having an axial bore opening into said chamber, a bearing pin extending into the bore in the shaft and engaged with said body member so that the shaft and cam member may be axially adjusted in the chamber relative to said pin, and means engaged with the end of said pin within the bore in the shaft and adjustable relative to the shaft to axially adjust the shaft and cam member.

6. In a valve, a valve body member having bores therein and a chamber coextensive with certain ends of said bores, valve seats in said bores, valves movable in said bores into and out of engagement with said seats, stems on said valves extending into said chamber, ports extending through said body member into said bores, a shaft extending into said chamber for rotation about an axis extending in the general direction of the major axes of said bores, stems on said valves extending into said chamber, a cam member mounted on said shaft within said chamber and operatively engaged with said stems, said shaft having an axial bore opening into said chamber, a bearing pin mounted in the bore in said shaft so as to provide for axial movement of the shaft relative to said pin, said pin having one end engaged with said body member to prevent movement of the pin relative to the body, adjusting means engaging the other end of said pin in the bore of the shaft and movable relative to said shaft to effect axial adjustment of the shaft and cam relative to said stems, and bearing means interposed between said cam and one wall of said chamber.

7. In a valve, a valve body member having bores therein and a chamber coextensive with certain ends of said bores, valve seats in said bores, valves movable in said bores into and out of engagement with said seats, stems on said valves extending into said chamber, ports extending through said body member into said bores, a shaft extending into said chamber for rotation about an axis extending in the general direction of the major axes of said bores, stems on said valves extending into said chamber, a cam member mounted on said shaft within said chamber and operatively engaged with said stems, said shaft having an axial bore opening into said chamber, a bearing pin extending into said bore and engaged with said body member so that the shaft and cam member may be axially adjusted in the chamber relative to said pin, and means engaged with the end of said pin within the bore in the shaft and adjustable relative to the shaft to axially adjust the shaft and cam member, including a screw turned in the bore in the shaft and a ball member interposed between said screw and said pin.

8. In a valve, a valve body member having bores therein and a chamber coextensive with certain ends of said bores, valve seats in said bores, valves movable in said bores into and out of engagement with said seats, stems on said valves extending into said chamber, ports extending through said body member into said bores, a shaft extending into said chamber for rotation about an axis extending in the general direction of the major axes of said bores, a cam member mounted on said shaft within said chamber and operatively engaged with said stems, said shaft having an axial bore opening into said chamber, and a bearing pin extending into the bore in the shaft and engaged with said body member so that the shaft and cam member may be axially adjusted in the chamber relative to said pin.

EUGENE M. MOREHOUSE.